Patented June 30, 1942

2,288,261

UNITED STATES PATENT OFFICE 2,288,261

TEXTILE PRINTING PASTE

John Abrams, Jersey City, N. J., assignor to Interchemical Corporation, New York, N. Y., a corporation of Ohio No Drawing. Application March 18, 1941,
Serial No. 383,925

4 Claims. (Cl. 8—70)

This invention relates to the art of textile printing, and has particular reference to a method of textile printing involving the use of water-in-lacquer emulsion printing pastes containing vat dyestuffs. Specifically, this invention is directed to the improvement of such pastes by the addition of small percentages of phosphatides, whereby improved prints are obtained.

In the Cassel U. S. Patent No. 2,202,283, issued May 28, 1940, there are described certain new methods of printing fabrics with dyestuffs, and certain new textile printing pastes, designed to overcome the poor printing properties of conventional dyestuff printing pastes made with water-soluble thickeners, and to increase the effectiveness of the dyestuff. These pastes are prepared by the emulsification of an aqueous solution of a dyestuff or a dyestuff component with a water-immiscible bodying composition (preferably a solution of a very small quantity—less than 5% of the finished emulsion—of a film-forming thickener in a water-immiscible solvent), the dyestuff solution being in the discontinuous phase. The resultant emulsion, of optimum consistency for printing, is applied to a fabric, as with a conventional intaglio cylinder; the dyestuff is fixed on the fabric after printing in conventional fashion. The pastes have excellent printing properties, and yield sharp prints of excellent fastness.

These new printing pastes are uniformly successful with most dyestuffs, but certain difficulties are encountered with vat dyestuffs. These materials are generally available as a mixture of water-soluble leuco compound and oxidized water-insoluble dyestuff; they are applied to fabric together with a reducing agent, so that all of the dyestuff passes through the leuco state in which it can be absorbed by the fabric, being then oxidized to the insoluble state in the fabric. When a water dispersion of such a mixture is made into a water-in-lacquer emulsion printing paste, the results obtained are often disappointing, particularly in that the intensity of color and the wash-fastness of the prints leave much to be desired.

Investigation of this phenomenon indicated that the water-insoluble vat dyestuff has a tendency to transfer from the water phase of the emulsion to the lacquer phase. On printing, the lacquer phase would then dry, embedding some of the color. As a result, the dyestuff would not pass through the soluble leuco state, and would be retained on the fabric as pigment adhered to the fabric by the lacquer thickener. Since the original insoluble color particle has not been developed for optimum pigment properties, color is weak; and this embedded color will disappear on washing, along with the thickener deposited from lacquer.

I have discovered that this flushing of water-insoluble vat dyestuff into the non-aqueous phase of the emulsion can be substantially prevented, and that water-in-lacquer emulsion printing pastes made with vat dyestuffs can be much improved by incorporating into the paste a small quantity of a phosphatide such as lecithin.

The phosphatide acts in some fashion unknown to me, since surface-active agents of other types do not give the same effect. Egg lecithin, soya lecithin, and synthetic phosphatides made from partial fatty acids of glycerin and phosphoric acid, all act in the same fashion.

The amount of lecithin required is very small. A gradual improvement is obtained as very small percentages are added; the effect becomes marked at about 0.2% of the total composition. I generally use between 0.2 and 1.0 of phosphatides. Since the material is oil-soluble, it is preferably added to the continuous non-aqueous phase.

A typical example of my invention is the following:

An aqueous mixture composed of

| | Parts by weight |
|---|---|
| Indanthrene Blue, RSA double (vat dyestuff—Color Index 1106) | 10 |
| Glycerin | 5 |
| Glyceine A (General Dyestuff) | 5 |
| Potassium carbonate | 9 |
| 40% Rongalite C (sodium formaldehyde sulfoxylate) | 9 |
| Water | 37 | was emulsified into a continuous organic phase consisting of—

| | Parts by weight |
|---|---|
| 500 centipoise ethyl cellulose of conventional solubility | 0.275 |
| Pine oil | 0.150 |
| Toluene | 12.075 |
| Solvesso #3 (hydrogenated petroleum solvent—B. R.—182—210° C.) | 12.500 |
| Soya bean lecithin | 0.500 |

This material was compared with an identical printing paste made without the lecithin. Where the material without the lecithin showed considerable flushing of the vat dye into the non-aqueous phase, the example showed substantially no flushing. On printing and developing, the example with the lecithin was considerably superior in sharpness of print, intensity of color, and resistance to washing and crocking.

Examples, of course, may be multiplied indefinitely without departing from the scope of my invention, which is defined in the claims. Thus, the emulsion may vary widely in composition. Any agent may be used to replace the ethyl cellulose which will resist the action of the alkali and reducing agent used with the vat dyestuff, other cellulose ethers and cumar and other resins resistant to alkali being among the better substitutes.

The quantities of water, of solvent, and of solute in both the aqueous and non-aqueous phases, may be varied as desired, in manner well known to the art, provided the stability of the emulsion is maintained.

I claim:

1. A textile decorating composition comprising an emulsion the inner phase of which is an aqueous liquid containing a vat dyestuff, and the outer phase of which is a water-immiscible bodying composition, and containing a phosphatide in quantity sufficient to substantially retard flushing of the vat dyestuff from the aqueous to the non-aqueous phase.

2. A textile decorating composition comprising an emulsion the inner phase of which is an aqueous liquid containing a vat dyestuff, and the outer phase of which is a solution of ethyl cellulose in a hydrocarbon solvent, and containing a phosphatide in quantity sufficient to substantially retard flushing of the vat dyestuff from the aqueous to the non-aqueous phase.

3. A textile decorating composition comprising an emulsion the inner phase of which is an aqueous liquid containing a vat dyestuff, and the outer phase of which is a solution of ethyl cellulose in a hydrocarbon solvent, and containing from about 0.2 to about 1.0% of lecithin.

4. A textile decorating composition comprising an emulsion the inner phase of which is an aqueous liquid containing a vat dyestuff, and the outer phase of which is an alkali-resisting lacquer comprising a solution of an alkali-resisting solute in a volatile water-immiscible solvent, and containing a phosphatide in quantity sufficient to substantially retard flushing of the vat dyestuff from the aqueous to the non-aqueous phase.

JOHN ABRAMS.